United States Patent [19]
Lange et al.

[11] Patent Number: 4,911,961
[45] Date of Patent: Mar. 27, 1990

[54] PLASTIC COVERING FOR ANTI-CORROSION PROTECTION OF ARTICLES AND THE LIKE

[75] Inventors: Gerhard Lange, Munich; Guenther Weber, Garching; Heinz Diermeier, Vaterstetten, all of Fed. Rep. of Germany

[73] Assignee: Siemens Aktiengesellschaft, Berlin and Munich, Fed. Rep. of Germany

[21] Appl. No.: 107,346

[22] Filed: Oct. 13, 1987

[30] Foreign Application Priority Data

Nov. 6, 1986 [DE] Fed. Rep. of Germany ....... 3637876

[51] Int. Cl.$^4$ .............................................. B65B 53/00
[52] U.S. Cl. .................................. 428/35.2; 428/906; 264/173
[58] Field of Search .................. 428/355, 906, 35.2; 264/173

[56] References Cited

U.S. PATENT DOCUMENTS

| 3,033,727 | 5/1962 | Cram et al. | |
| 4,001,065 | 1/1977 | Penneck et al. | |
| 4,144,111 | 3/1989 | Schaerer | 264/173 |
| 4,364,972 | 12/1982 | Moon | 428/355 |
| 4,397,992 | 8/1983 | Johansson et al. | 525/305 |
| 4,563,388 | 1/1986 | Bonk et al. | 428/355 |
| 4,726,982 | 2/1988 | Traynor et al. | 428/355 |

FOREIGN PATENT DOCUMENTS 527460  9/1976  U.S.S.R. .............................. 524/516

Primary Examiner—Edith Buffalow
Attorney, Agent, or Firm—Hill, Van Santen, Steadman & Simpson

[57] ABSTRACT

A plastic covering for the anti-corrosion protection of articles is provided. The plastic covering is particularly directed to the repairing or sealing of plastic envelopes. The plastic covering is constructed from a non-cross-linked meltable plastic compound to which an organic peroxide is added.

11 Claims, No Drawings

PLASTIC COVERING FOR ANTI-CORROSION PROTECTION OF ARTICLES AND THE LIKE

BACKGROUND OF THE INVENTION

The present invention relates generally to a plastic covering for the anti-corrosion protection of articles and the like. More specifically, the present invention relates to plastic coverings for the repair or sealing of plastic envelopes.

To protect metal pipes, electrical or optical conductors, as well as cables, it is known to surround these articles with hose-like structures of plastic to protect them from environmental influences. These hose-like structures or envelopes are preferably constructed from polyolefins.

Although these envelopes do protect the covered article from the corrosive effects of the environment, they are, however, subject to a risk that they can be damaged by mechanical forces and influences. This thereby limits the usefulness of the envelopes in protecting articles and the like. Once the envelope has been damaged by, for example, a mechanical force, the envelope must be repaired in order to restore the protective functions of the envelope.

Typically, repair bands are used to repair the envelope. These repair bands are usually composed of a cross-linked polyolefin foil coated on one side with a hot-melt adhesive. Examples of such repair bands are described in, for example, German Patent Application No. 22 50 096 and U.S. Pat. No. 3,033,727. The suitabilily and reliability of these commercially available repair bands depends, to a great extent, on the quality of the adhesion, or gluing, of the band to the corresponding foundation of the envelope. Moreover, because the connection of the repair band to the envelope is based on the adhesion of the repair band to the envelope it is greatly dependent on temperature fluctuations. At high temperatures, there is a risk of a separation of the band from the envelope due to a softening of the hot-melt adhesive used to secure the band to the envelope. At low temperatures, an embrittlement of the adhesive can occur and can lead to a separation of the repair band from the envelope or at least to a loss of the strength of the seal of the repair band to the envelope.

There is therefore a need for an improved plastic covering for repairing and sealing envelopes that provide an anti-corrosion protection to articles and the like.

SUMMARY OF THE INVENTION

The present invention provides a plastic covering that overcomes the disadvantages set forth above. To this end, the present invention provides an improved plastic covering composed of a non-crosslinked meltable plastic compound to which an organic peroxide is added. Preferably, the plastic compound includes at least polyethylene.

One of the principle advantages of the plastic covering of the present invention, over typical repair bands, is that the plastic covering is not "glued" to the substrate by adhesion with a corresponding adhesive, as heretofore standard with repair bands, but, rather, is secured by a chemical bonding in the form of a vulcanization that proceeds without an adhesive.

In an embodiment of the present invention, the plastic covering is constructed from a non-crosslinked plastic compound consisting essentially of polyethylene to which organic peroxide is added.

In an embodiment of the invention, the plastic covering is constructed from a polyethylene and ethylene vinyl acetate composition to which peroxide has been added.

In an embodiment of the present invention, the plastic covering is constructed from ethylenecopolymerizate with acrylic acid and acrylicester composition to which peroxide has been added.

In an embodiment of the present invention, the plastic covering is constructed from a polyethylene and ethylenecopolymerizate with butylacrylate composition to which peroxide has been added.

DETAILED DESCRIPTION OF THE PRESENTLY PREFERRED EMBODIMENTS

The present invention provides an improved plastic covering for articles and specifically an improved covering for repairing or sealing plastic envelopes. The plastic covering is constructed from a non-crosslinked plastic compound that is preferably constructed, at least in part, from polyethylene to which is added an organic peroxide.

The specific properties for securing the plastic covering of the present invention to the corresponding surfaces of the articles to be covered are achieved by the chemical structure of the material. The covering can be adapted to the mechanical properties of the surface to be covered by an appropriate selection of the compound components. The plastic covering is also drawn in its non-crosslinked condition, so that inner stresses are built up to a low degree.

The covering is specifically designed for repairing a great variety of hoses and cable claddings. To this end, the plastic covering of the present invention can be manufactured and used as either a patch, a band, or as wound tape. This allows the plastic covering to be adaptable to repair small areas of demage to the envelopes as well as sections that are large in area. Further, the material for manufacturing these plastic coverings of the present invention has very good adhesive properties to aluminum and steel surfaces, so that coatings of such surfaces can likewise be carried out with great success as opposed to traditional repairs that use adhesion.

In use, the location to be repaired, for example a defect in a polyethylene cable cladding, is covered with the plastic covering of the present invention or, in an embodiment of the invention wherein the covering is wound tape, the article is wrapped with the covering. To secure the covering to an article, first, the ends of the coverings are heated until they melt. For example, to melt the ends of the covering in an expedient manner, the flame of a propane gas torch can be utilized. After being so heated, the ends are fixed on the repair location of the article by lightly pressing the covering thereto. Accordingly, in contrast to the prior art methods, the use of adhesive tape is not required to fix the covering to the article or envelope. By applying additional heat, the plastic covering shrinks, due to the inner stresses and, finally, begins to melt. The outermost layers of the article to be repaired such as, for example, a polyethylene cladding, likewise begin to soften in response to the heat and a fusing of the boundary surfaces occurs.

With the application of further energy, the peroxide in the covering decomposes thereby effecting a cross-linking of the melted portions of the covering and the boundary surface of the article to be covered. A vulcanization of the covering to the material of the article to be enveloped, for example to the polyethylene cladding, thereby occurs. The quality of the bond of the covering to the article is not temperature-dependent, in contrast to the prior art repair bands, e.g., hot-melt adhesives.

It is envisioned that the plastic coverings of the present invention can be made in a variety of embodiments and therefore, can be adapted to the specific requirements needed. To this end, the plastic covering can include a plurality of layers that have different material properties. For example, a multi-layer structure comprising a hard outer layer and a soft inner layer can be constructed so that various stresses of the surface can also be influenced. Likewise, as set forth above, the covering can be a wound tape or a patch depending on the specific requirements.

By way of example, and not limitation, the composition of the plastic covering of the present invention can be: a polyethylene and peroxide composition; a polyethylene, ethylene vinyl acetate and peroxide composition; a polyethylene, ethylenecopolymerizate with acrylic acid and acrylicester, and peroxide composition; or a polyethylene, ethylenecopolymerizate with butylacrylate, and peroxide composition. As previously stated, depending on particular requirements, such as the construction of the article or envelope to which the covering is to be secured one plastic composition may be preferred over another.

Furthermore, the covering of the present invention can include means for illustrating when the covering has been heated to a certain temperature. To this end, commercially available color compositions that change their color when a required temperature is applied to the composition can be utilized. This provides a plastic covering wherein the color can serve as a point of reference for determining the correct application of heat to the covering.

It should be understood that various changes and modifications to the presently preferred embodiments described herein will be apparent to those skilled in the art. Such changes and modifications can be made without departing from the spirit and scope of the present invention and without diminishing it attendant advantages. It is therefore intended that such changes and modifications be covered by the appended claims.

We claim:

1. A plastic covering, for the anti-corrosion protection of articles, composed of a meltable non-crosslinked plastic compound, whose surface is fusable with an outer surface of the articles to be protected and once fused, the surfaces are mutually crosslinkable, the plastic compound including polyethylene to which an organic peroxide has been added, the plastic compound having been drawn in its non-crosslinked condition.

2. The plastic covering of claim 1 wherein the plastic compound includes means for changing at least a portion of a color of the compound in response to the application of heat.

3. The plastic covering of claim 1 wherein the plastic compound consists essentially of polyethylene and peroxide.

4. The plastic covering of claim 1 wherein the covering is constructed as a wrapping tape.

5. The plastic covering of claim 1 wherein the compound material has similar properties of yield stress, yield stretching, resistance to tearing, elongation at tear or peeling resistance to those of a corresponding material from which the article is constructed.

6. A plastic covering for repairing or sealing a plastic envelope for enclosing an article, the plastic covering being constructed from a non-crosslinked meltable plastic compound, whose surface is fusable with an outer surface of the article to be protected and once fused, surfaces are mutually crosslinkable, the plastic compound including an organic peroxide.

7. A plastic covering of claim 6 wherein the plastic compound includes polyethylene.

8. The plastic covering of claim 7 wherein the plastic compound is drawn.

9. The plastic covering of claim 6 wherein the plastic compound includes means for changing at least a portion of a color of the compound in response to the application of heat.

10. The plastic covering of claim 6 wherein the covering is constructed as a wrapping tape.

11. The plastic covering of claim 6 wherein the compound material has similar properties of yield stress, yield stretching, resistance to tearing, elongation at tear or peeling resistance to those of a corresponding material from which the article is constructed.

* * * * *